(12) United States Patent
Kendall et al.

(10) Patent No.: US 10,380,681 B2
(45) Date of Patent: Aug. 13, 2019

(54) REAL-TIME DATA PROCESSING

(71) Applicant: Bank of America Corporation, Charlotte, NC (US)

(72) Inventors: Charles R. Kendall, Seattle, WA (US); Joseph B. Castinado, Northglenn, CO (US); Bonnie L. Dolan, Lincoln, CA (US)

(73) Assignee: Bank of America Corporation, Charlotte, NC (US)

( * ) Notice: Subject to any disclaimer, the term of this patent is extended or adjusted under 35 U.S.C. 154(b) by 985 days.

(21) Appl. No.: 14/847,220

(22) Filed: Sep. 8, 2015

(65) Prior Publication Data

US 2017/0069019 A1  Mar. 9, 2017

(51) Int. Cl.
*G06Q 40/00* (2012.01)
*G06Q 40/02* (2012.01)

(52) U.S. Cl.
CPC ................... *G06Q 40/02* (2013.01)

(58) Field of Classification Search
CPC .................................................... G06Q 40/00
USPC ....................................................... 705/36 R
See application file for complete search history.

(56) References Cited

U.S. PATENT DOCUMENTS

| | | | | | |
|---|---|---|---|---|---|
| 5,237,159 | A | * | 8/1993 | Stephens | G06Q 20/02 235/379 |
| 5,265,007 | A | * | 11/1993 | Barnhard, Jr. | G06Q 20/02 235/379 |
| 5,691,524 | A | * | 11/1997 | Josephson | G06Q 20/02 235/375 |
| 5,717,868 | A | * | 2/1998 | James | G06Q 20/10 705/35 |
| 5,910,989 | A | * | 6/1999 | Naccache | G06Q 20/341 380/29 |
| 6,016,484 | A | * | 1/2000 | Williams | G06Q 20/00 235/375 |
| 6,164,528 | A | * | 12/2000 | Hills | G06Q 20/04 235/379 |
| 6,189,785 | B1 | * | 2/2001 | Lowery | G06Q 20/04 235/379 |

(Continued)

OTHER PUBLICATIONS

U.S. Appl. No. 14/847,378, filed Sep. 8, 2015, Kendall et al.

*Primary Examiner* — Kirsten S Apple
(74) *Attorney, Agent, or Firm* — Michael A. Springs (57) ABSTRACT

In certain embodiments, a system for real-time overdraft detection includes one or more processors operable to: determine a deposit financial institution and deposit account based on the received check data, determine a debit financial institution and debit account based on the received check data, determine that the deposit financial institution and the debit financial institution are member financial institutions, determine a debit amount based on received check data, determine that the debit account matches an account associated with received account data, and determine that the debit amount exceeds an approved debit amount; the one or more interfaces further operable to communicate a declined transaction notification to the deposit account holder in response to determining that the debit amount exceeds the approved debit amount, the declined transaction notification notifying the deposit account holder that the debit amount cannot be credited to the deposit account holder.

20 Claims, 6 Drawing Sheets

(56) References Cited

U.S. PATENT DOCUMENTS

| | | | | |
|---|---|---|---|---|
| 6,193,152 B1* | 2/2001 | Fernando | G06K 9/00154 | 235/379 |
| 6,230,148 B1* | 5/2001 | Pare, Jr. | G01F 19/005 | 380/229 |
| 6,581,042 B2* | 6/2003 | Pare, Jr. | G01F 19/005 | 380/229 |
| 6,662,166 B2* | 12/2003 | Pare, Jr. | G01F 19/005 | 235/380 |
| 6,950,810 B2* | 9/2005 | Lapsley | G01F 19/005 | 235/380 |
| 6,970,855 B2* | 11/2005 | Das | G06Q 10/08 | 705/16 |
| 7,099,845 B2* | 8/2006 | Higgins | G06Q 20/02 | 705/35 |
| 7,359,880 B2* | 4/2008 | Abel | G06Q 20/02 | 235/379 |
| 7,430,537 B2* | 9/2008 | Templeton | G06Q 10/0635 | 705/26.35 |
| 7,996,312 B1 | 8/2011 | Beck | G06Q 20/042 | 235/379 |
| 2002/0004760 A1* | 1/2002 | Yoshida | G06Q 20/04 | 705/26.1 |
| 2002/0065774 A1* | 5/2002 | Young | G06O 20/02 | 705/41 |
| 2004/0143553 A1* | 7/2004 | Torget | G06Q 10/10 | 705/66 |
| 2004/0247168 A1* | 12/2004 | Pintsov | G06K 9/2054 | 382/137 |
| 2005/0144131 A1* | 6/2005 | Aziz | G06Q 20/04 | 705/42 |
| 2010/0226559 A1* | 9/2010 | Najari | G06K 9/186 | 382/140 |
| 2011/0191241 A1* | 8/2011 | Blain | G06O 20/10 | 705/42 |
| 2013/0198069 A1* | 8/2013 | Latimer | G06Q 40/02 | 705/42 |
| 2014/0046841 A1* | 2/2014 | Gauvin | G06Q 40/02 | 705/43 |
| 2014/0233831 A1* | 8/2014 | Palmer | G06F 17/30244 | 382/137 |
| 2014/0236820 A1* | 8/2014 | Carlton | G06Q 20/108 | 705/42 |
| 2015/0120563 A1* | 4/2015 | Smith | G06Q 20/10 | 705/45 |

* cited by examiner

FIG. 1

| FI | Account Identifier | Approved Debit Amount |
|---|---|---|
| Financial Institution 1 | ABCD1234 | $5,000 |
| Financial Institution 2 | EFGH5678 | $10,000 |
| Financial Institution 3 | IJKL9101 | $20,000 |

REAL-TIME DATA PROCESSING

TECHNICAL FIELD

This disclosure relates generally to data processing, and more particularly to a real-time network for data processing.

BACKGROUND

Existing networks for communicating electronic data associated with financial transactions involving checks are burdensomely slow for many customers. A common complaint from customers of financial institutions is that they cannot get immediate access to funds from a deposited check. Further, recipients of checks cannot immediately determine whether there are sufficient funds in the checking account to cover the amount of the check (e.g., a check bounces). The risk of insufficient funds to cover the amount of the check prevents many retailers and individuals from accepting personal checks.

SUMMARY OF EXAMPLE EMBODIMENTS

According to embodiments of the present disclosure, disadvantages and problems associated with providing internal services to external enterprises may be reduced or eliminated.

In certain embodiments, a system for real-time data processing includes one or more interfaces operable to: receive account data associated with financial accounts at plurality of financial institutions, the received account data including one or more from the set comprising: an account identifier and approved debit amount associated with the account identifier; and receive check data associated with a scanned check; one or more databases communicatively coupled to the one or more interfaces, the one or more databases operable to store the received account data; one or more processors communicatively coupled to the one or more interfaces and one or more databases, the one or more processors operable to: determine a deposit account based on the received check data, determine a deposit financial institution associated with the determined deposit account, determine a debit account based on the received check data, determine a debit financial institution associated with the determined debit account, determine that the deposit financial institution and the debit financial institution are member financial institutions, determine a debit amount based on the received check data; and the one or more interfaces further operable to: communicate a debit notification to the debit financial institution, the debit notification including at least a portion of the received check data, and receive an authorization notification from the debit financial institution in response to communicating the debit notification, the authorization notification representing a commitment from the debit financial institution to transfer the debit amount to the deposit financial institution.

In particular embodiments, a system for real-time overdraft detection includes one or more interfaces operable to: receive account data associated with financial accounts at plurality of financial institutions, the received account data including one or more from the set comprising: an account identifier and approved debit amount associated with the account identifier; and receive check data associated with a scanned check; one or more databases communicatively coupled to the one or more interfaces, the one or more databases operable to store the received account data; one or more processors communicatively coupled to the one or more interfaces and one or more databases, the one or more processors operable to: determine a deposit account based on the received check data, determine a deposit financial institution associated with the determined deposit account, determine a debit account based on the received check data, determine a debit financial institution associated with the determined debit account, determine that the deposit financial institution and the debit financial institution are member financial institutions, determine a debit amount based on the received check data, determine that the debit account matches an account associated with the received account data, and determine that the debit amount exceeds the approved debit amount; the one or more interfaces further operable to communicate a declined transaction notification to the deposit account holder in response to determining that the debit amount exceeds the approved debit amount, the declined transaction notification notifying the deposit account holder that the debit amount cannot be credited to the deposit account holder.

Certain embodiments of the present disclosure may provide one or more technical advantages having specific technical effects.

In an embodiment, the system provides real-time access to funds from a deposited check, thereby conserving bandwidth and computational resources consumed by placing temporary holds on deposited funds until the deposited formally clears (e.g., automated clearing house ("ACH").

In an embodiment, the system provides real-time overdraft detection, thereby conserving the bandwidth and computational resources consumed by reversing a completed transaction due to an overdrawn account.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

In an embodiment, a system is operable to provide real-time check processing and/or real-time overdraft detection independent of traditional automated clearing house ("ACH") check processing and settlement. For example, a number of financial institutions may enter into an agreement (e.g., a joint venture, contractual agreement, or other suitable agreement) for a process to provide their customers with real-time access to funds deposited by check. These member financial institutions may maintain a centralized repository of customer account information and may agree to a process for processing checks in real-time between the member financial institutions that occurs in independently, and possibly in parallel to, the traditional ACH check clearing and settlement process.

In certain embodiments, a real-time processing module (e.g., maintained by the member financial institutions) receives data associated with a check (e.g., check data) from check readers at a point-of-transaction ("POT"). The real-time processing module may identify a debit financial institution and debit account, a deposit financial institution and deposit account, and a debit amount from the received check data. In an embodiment, real-time processing module may verify that the debit and deposit financial institutions are member financial institutions, and/or that the debit account is approved for real-time check processing.

The real-time processing module may communicate the debit account and debit amount to the debit financial institution as part of a debit notification. If the debit financial institution determines that there are sufficient funds in the debit account to cover the debit amount, the debit financial institution may communicate an authorization notification to the real-time processing module indicating a commitment (e.g., based on the agreement between member financial institutions) by the debit financial institution to credit the debit amount to the deposit financial institution. If the debit financial account determines that there are insufficient funds in the debit account to cover the debit amount, the debit financial institution may communicate an insufficient funds notification to the real-time processing module, which may pass that information to the POT as an overdraft notification.

If the real-time processing module receives an authorization notification from the debit financial institution, it may pass that information to the deposit financial institution as a credit notification. Once the deposit financial institution receives the credit notification indicating the debit financial institutions commitment to credit the debit amount to the deposit financial institution, the deposit financial institution may make the debit amount available to the depositing account holder for withdrawal and indicate this to the real-time processing module with a clearance notification. If the real-time processing module receives a clearance notification, the real-time processing module may send the POT a completion notification indicating that the deposit financial institution has made the debit amount available to the deposit account holder for withdrawal. Accordingly, the system may provide a real-time check processing with member financial institutions that occurs independently of traditional ACH check clearance and settlement.

Figure 1:
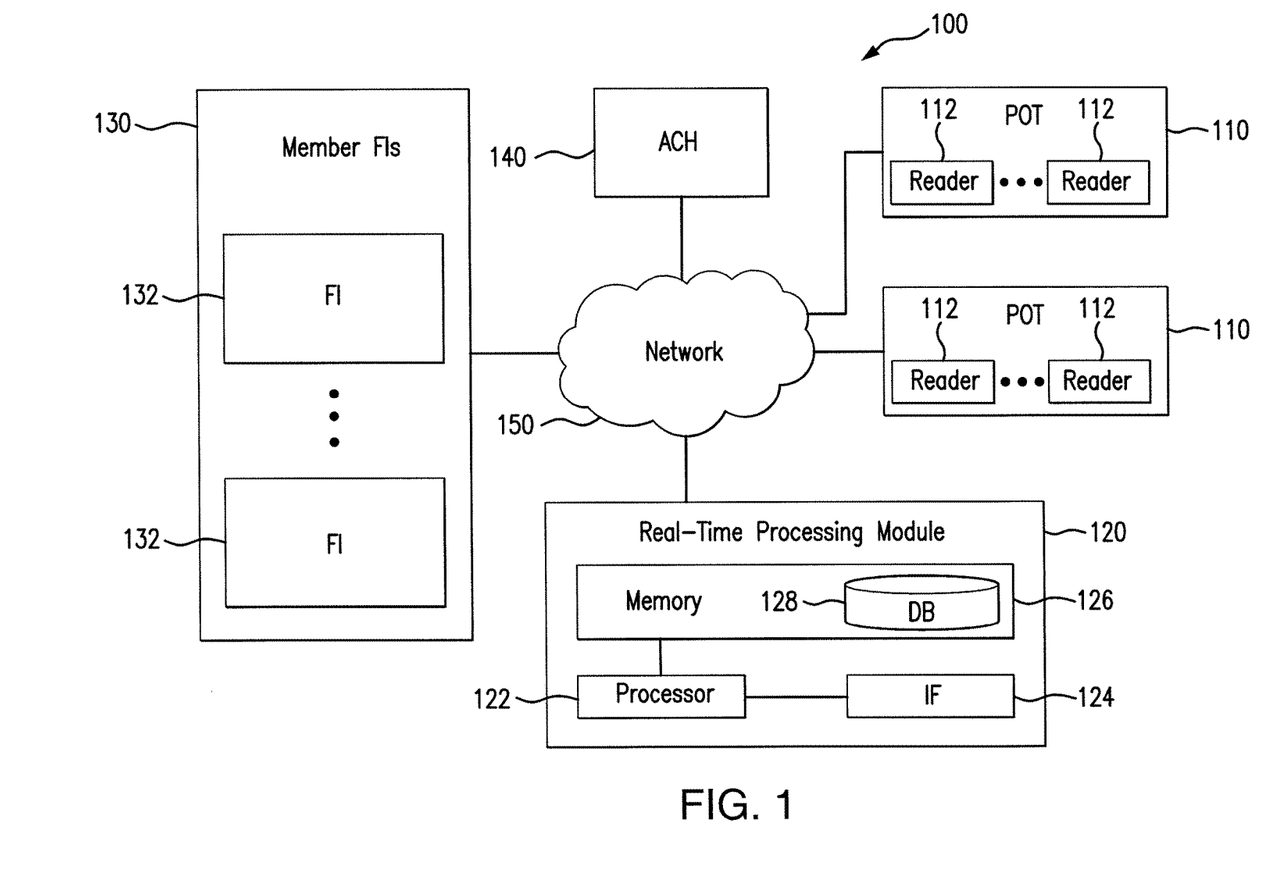
FIG. 1 illustrates an example system for real-time data processing.

FIG. 1 illustrates an example system 100 for real-time data processing. According to an embodiment, system 100 includes points-of-transaction ("POT") 110, real-time processing module ("RTPM") 120, member financial institutions ("FIs") 130, automated clearing house ("ACH") 140, and network 150. In certain embodiments, POTs 110 include check readers 112. Check readers 112 may be operable to extract data from scanned checks (e.g., check images). Member financial institutions 130 may include a plurality of financial institutions 132.

Points-of-transaction ("POTs") 110 represent contact points for a financial transaction involving a check. In certain embodiments, POTs may be retail stores (e.g., a cash register), individuals (e.g., using a smart phone), online retailers (e.g., websites receiving images of checks), or any other suitable entity involved in a financial transaction involving a check. POTs 110 may include one or more check readers 112.

Check readers 112 represent any electronic device operable to read information off of a check, for example, by scanning the check. Check readers 112 may generate an image of a check and/or may extract information by scanning a check. Check readers 112 may communicate all or a portion of the data read from a check (e.g., check data) to real-time processing module 120. This information may include one or more of: an image of the check, an account number of the check, a routing number of the check, an amount the check is made out for (e.g., the debit amount), an entity to whom the check is made out, a financial institution maintaining the checking account associated with the check (e.g., the debit financial institution), a financial institution maintaining an account where the check is to be deposited (e.g., the deposit financial institution), a date written on the check, a check number, one or more signatures on the check (e.g., a signature of the entity writing the check and/or a signature of an entity endorsing the check), or any other suitable information. In certain embodiments, check readers 112 may include wireless communication devices such as smart phones with digital cameras, scanners, barcode scanners, or any other suitable device operable to read information from a check.

Real-time processing module 120 ("RTPM") represents a component of system 100 operable to interface with POTs 110 and member financial institutions 130. In certain embodiments, RTPM 120 is operable to interface with POTs 110 and member financial institution 130 to process financial transactions involving checks. RTPM 120 may include one or more processors 122, interfaces 124, memories 126, and databases 128. In particular embodiments, RTPM 120 is operable to receive account data from a plurality of member financial institutions 130. Account data may include data associated with accounts approved by individual member financial institutions 132 for real-time check processing, and may include one or more of an identifier of an account, an identifier of the financial institution 132 maintaining the account, an identifier of the account holder, an approved debit amount (e.g., an amount the financial institution 132 maintaining the account has approved to be debited from the account), or any other suitable information.

In an embodiment, RTPM 120 maintains received account data in database 128. Account data may include real-time account balances, or may include threshold transaction levels where transactions below the threshold level are approved by the corresponding financial institution 132. In certain embodiments, account data may be used by RTPM 120 to determine whether a particular transaction qualifies for real-time check processing. For example, RTPM 120 may determine from account data in database 128 whether the debit financial institution and/or deposit financial institution are member financial institutions 130, whether the debit account and/or deposit account are approved for real-time check processing (e.g., account data for the debit account and/or deposit account has been received by RTPM 120), whether the debit amount is below a threshold (e.g., below the current debit account balance or below a predetermined threshold the debit financial institution has approved for the debit account), or any other suitable determination. An example of information that may be included in database 128 is discussed in more detail below with respect to FIG. 2.

In certain embodiments, RTPM 120 is operable to interface between POTs 110 and member financial institutions 130 for real-time processing of financial transactions involving checks. For example, check readers 112 at POT 110 may read data from a check and communicate information read from the check (e.g., check data) to RTPM 120. In an embodiment, RTPM 120 is operable to communicate received check data to individual member financial institutions 132, such as the financial institution 132 maintaining the checking account (e.g., the debit financial institution) and the financial institution 132 maintaining the account to which the check is being deposited (e.g., the deposit financial institution), to coordinate agreements for the transfer of funds from the debit financial institution to the deposit financial institution and to coordinate agreements for the immediate availability of funds from the deposit financial institution to the deposit account holder. After receiving check data from POTs 110, RTPM 120 may be operable to provide a deposit account holder with real-time access to funds from a deposited check based on information already received from member financial institutions 130 (e.g., for transactions below an approved debit amount), or may coordinate with member financial institutions 130 after receiving check data from POTs 110 to provide the deposit account holder with real-time access to funds from a deposited check. An example of a message flow for real-time processing of financial transactions involving checks is discussed in more detail below with respect to FIG. 3.

In an embodiment, RTPM 120 is operable to interface between POTs 110 and member financial institutions 130 for real-time overdraft detection in financial transactions involving checks. For example, check readers 112 at POT 110 may read data from a check and communicate information read from the check (e.g., check data) to RTPM 120. In an embodiment, RTPM 120 is operable to communicate received check data to individual member financial institutions 132, such as the financial institution 132 maintaining the checking account (e.g., the debit financial institution) and the financial institution 132 maintaining the account to which the check is being deposited (e.g., the deposit financial institution), to coordinate agreements for the transfer of funds from the debit financial institution to the deposit financial institution and to coordinate agreements for the immediate availability of funds from the deposit financial institution to the deposit account holder. If the debit financial institution determines that the debit account has insufficient funds to cover the amount of the check (e.g., the debit amount), the debit financial institution may notify RTPM 120 that there are insufficient funds and RTPM 120 may notify POTs 110 that the check has over drafted its associated checking account and cannot be deposited. Accordingly, POTs 110 will receive real-time notification that a check is bad, and can prevent the financial transaction from occurring (e.g., a retailer could refuse sale or obtain other forms of payment). After receiving check data from POTs 110, RTPM 120 may be operable to provide a deposit account holder with real-time overdraft detection based on information already received from member financial institutions 130 (e.g., database 128 may have current account information from financial institutions 132), or may coordinate with member financial institutions 130 after receiving check data from POTs 110 to provide the deposit account holder with real-time overdraft detection. An example of a message flow for real-time overdraft detection is discussed in more detail below with respect to FIG. 4.

Member financial institutions 130 represent a plurality of financial institutions 132 that have entered into an agreement (e.g., a joint venture, contractual agreement, and/or other suitable agreement) to perform real-time processing of checks to make deposited checks available to the depositor in real-time. Further, to the extent a deposited check is determined to have over drafted an associated checking account, member financial institutions are able to provide real-time overdraft notification to POTs 110. Financial institutions 132 may include organizations such as commercial banks, savings and loan associations, credit unions, Internet banks, mutual fund companies, brokerage firms, credit card companies, or other entity. In certain embodiments, financial institutions 132 have different business units or subdivisions that handle different business activities.

Traditionally, checks are processed by automated clearing house ("ACH") 140, and check depositors must wait for the check to clear ACH 140 before they can withdraw the deposited funds. Automated clearing house ("ACH") 140 represents an electronic network clearing and settling credit and debit transaction. ACH 140 does not process transactions in real-time and, instead, processes transactions in batches. This batching process is slow and many customers of financial institutions want immediate access to deposited funds. Member financial institutions 130 may, independent of ACH 140 check clearing, agree to honor a financial transaction involving a check in order to provide customers real-time access to funds deposited by check. This independent and real-time check processing may occur in parallel with traditional ACH 140 check clearing and settling. For example, various regulatory organizations may require financial institutions to process checks according to particular regulations. However, member financial institutions 130 may agree between themselves to honor financial transaction involving a check independent of ACH 140 check clearing and settling, thereby allowing member financial institutions 130 to provide real-time check processing to their customers without replacing the traditional ACH 140 check clearing and settling processes.

Network 150 represents any suitable network operable to facilitate communication between components of system 100, such as POTs 110, real-time processing module 120, member financial institutions 130, and ACH 140. Network 150 may include any interconnecting system capable of transmitting audio, video, electrical signals, optical signals, data, messages, or any combination of the preceding. Network 150 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

A module (e.g., module 120) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as real-time processing module 120, may include one or more processors. A processor represents any computing device, such as processors 122, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., module 120), an interface (e.g., interface 124), a memory (e.g., memory 126), a database (e.g., database 128), or any other suitable component.

An interface represents any device, such as interface 124 operable to receive input, send output, process the input or output, or perform other suitable operations for a component of system 100. An interface includes any port or connection, real or virtual, including any suitable hardware or software, including protocol conversion and data processing capabilities, to communicate through network 150. In certain embodiments, an interface includes a user interface (e.g., physical input, graphical user interface, touchscreen, buttons, switches, transducer, or any other suitable method to receive input from a user).

A memory represents any device, such as memory 126, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., database 128).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

Modifications, additions, or omissions may be made to system 100. System 100 may include more, fewer, or other components. Any suitable component of system 100 may include a processor, interface, logic, memory, or other suitable element.

Figure 2:
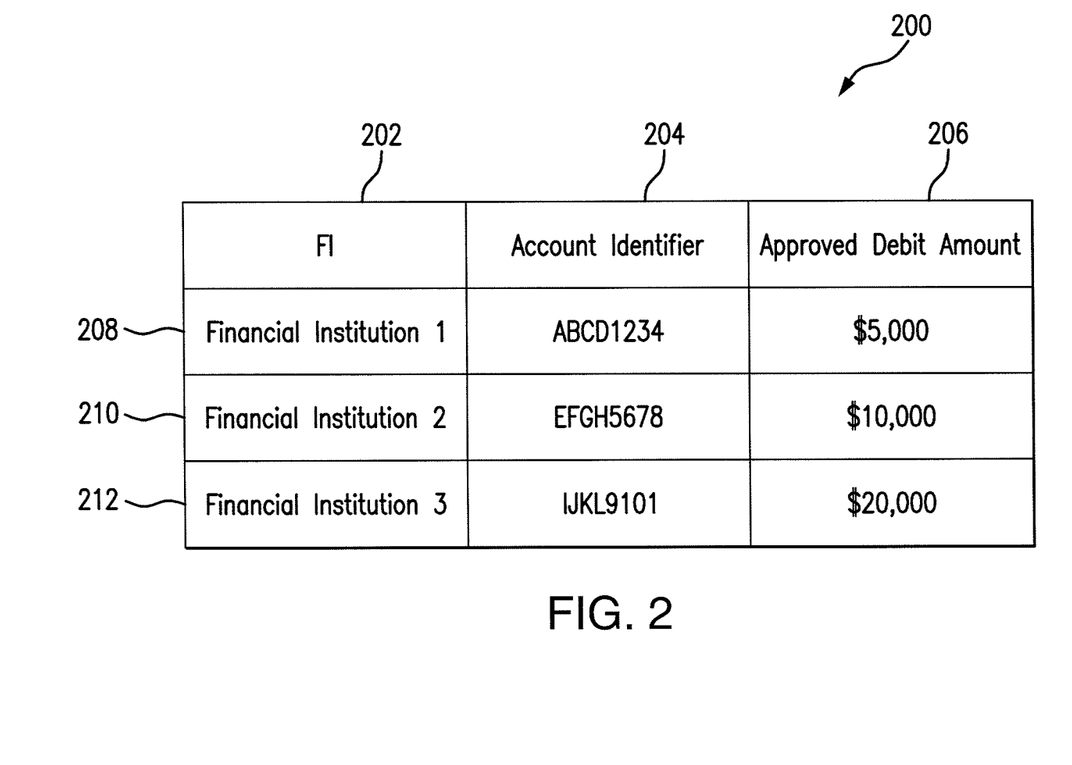
FIG. 2 illustrates an example table of account data of an example system for real-time data processing.

FIG. 2 illustrates an example table 200 of account data of an example system for real-time data processing. Table 200 represents an example of account information that may be maintained by database 128. Table 200 includes financial institution ("FI") column 202, account identifier column 204, and approved debit amount column 206. Financial institution column 202 represents an identifier of a financial institution (e.g., a financial institution 132) maintaining a particular financial account (e.g., a checking account). Account identifier column 204 represents an identifier of a particular financial account (e.g., a checking account).

Account identifier column 204 may include account numbers, routing numbers, or any other suitable identifier operable to uniquely identify a financial account. Approved debit amount column 206 represents a debit amount approved by the financial institution identified in financial institution column 202 for the financial account identified by account identifier column 204. In certain embodiments, the value in approved debit amount column 206 represents an amount pre-approved by the financial institution identified in financial institution column 202 for the financial account identified by account identifier column 204, such that real-time processing module 120 may provide real-time access to funds debited from the account identified by account identifier column 204 without additional contact with the financial institution identified by financial institution column 202.

In an embodiment, approved debit amount column 206 may represent an amount pre-approved by the financial institution identified in financial institution column 202 for the financial account identified by account identifier column 204 to participate in real-time check processing, such that if the debit amount exceeds the value identified by approved debit amount column 206, real-time processing module 120 can reject real-time processing. However, even if the debit amount is below the value identified by approved debit amount column 206, real-time processing module 120 may still need to communicate with the financial institution identified by financial institution column 202 in order to complete real-time processing of the check.

Row 208 includes "financial institution 1" in financial institution column 202, "ABCD1234" in account identifier column 204, and "$5,000" in approved debit amount column 206. In this example, "financial institution 1" has determined that account "ABCD1234" is approved for real-time check processing for debit amounts below "$5,000." Row 210 includes "financial institution 2" in financial institution column 202, "EFGH5678" in account identifier column 204, and "$10,000" in approved debit amount column 206. In this example, "financial institution 2" has determined that account "EFGH5678" is approved for real-time check processing for debit amounts below "$10,000." Row 208 includes "financial institution 3" in financial institution column 202, "IJKL9101" in account identifier column 204, and "$20,000" in approved debit amount column 206. In this example, "financial institution 2" has determined that account "IJKL9101" is approved for real-time check processing for debit amounts below "$20,000." These examples illustrate how different accounts may have different approved debit amounts for real-time check processing. Further, in the event that one or more of the financial institution or account are not identified in table 200, real-time processing module 120 may determine that the check is not approved to participate in real-time check processing.

Modifications, additions, or omissions may be made to table 200. Table 200 may include more or less fields, and may include any information relevant to real-time data processing, real-time overdraft notification, crediting funds related to a check, and/or debiting funds related to a check. Table 200 may include any suitable amount of information and may be stored in any suitable type or number of memories.

Figure 3:
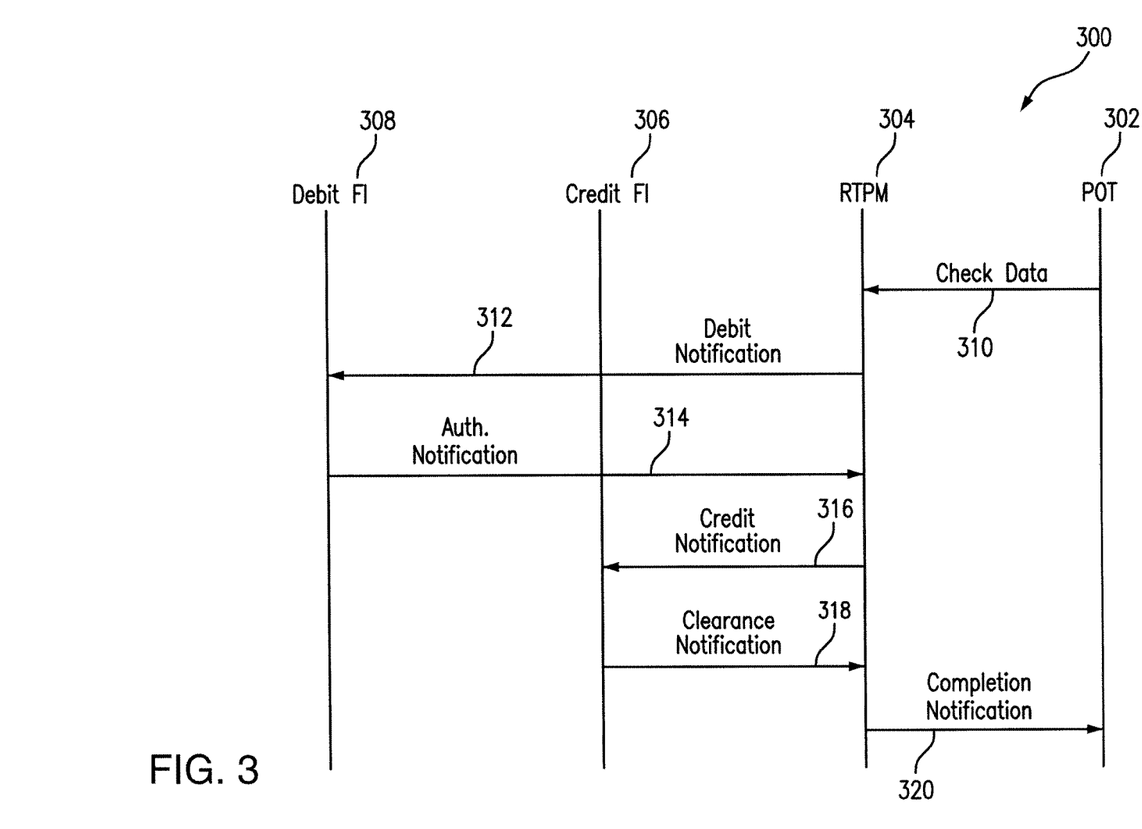
FIG. 3 illustrates an example message flow of an example system for real-time data processing.

FIG. 3 illustrates an example message flow 300 of an example system for real-time data processing. Message flow 300 includes POT ("point-of-transaction") 302, RTPM ("real-time processing module") 304, credit financial institution 306, and debit financial institution 308. These entities are explained in more detail with respect to FIG. 1.

Message flow 300 begins when POT 302 communicates a message including check data to RTPM 304. Check data may include any suitable information related to a check, for example, a scanned image of the check, account identifiers (e.g., account numbers), a debit amount (e.g., the amount for which the check is made out), a crediting entity (e.g., the entity to which the check is made out), a debit financial institution (e.g., the financial institution holding the checking account associated with the check), a credit financial institution (e.g., the financial institution holding the account where the debit amount from the check will be credited), or any other suitable information.

RTPM 304 may determine whether financial transaction involving the check data is qualified for real-time check processing (e.g., using database 128). If the financial transaction qualifies for real-time check processing, RTPM 304 communicates debit notification 312 to debit financial institution 308 indicating, for example, the debit amount, the debit account, and the credit account. Debit financial institution 308 may determine whether the identified debit account has sufficient funds to cover the debit amount. If debit financial institution 308 determines that the debit account has sufficient funds to cover the debit amount, debit financial institution communicates authorization notification 314 to RTPM 304 indicating a commitment from debit financial institution 308 to transfer the debit amount to credit financial institution 306.

In response to receiving authorization notification 314, RTPM 304 communicates credit notification 316 to credit financial institution 306 indicating that debit financial institution 308 has committed to transfer the debit amount to credit financial institution 306 and may further identify the corresponding credit account. Once credit financial institution 306 receives credit notification 316, it may make the debit amount available to the account holder of the credit account, and communicate a clearance notification to RTPM 304 indicating that the debit amount is available to the credit account holder for withdrawal. In response to receiving clearance notification 318, RTPM 304 communicates a completion notification to POT 302 indicating that credit financial institution 306 has made the debit amount available to the credit account holder for withdrawal.

Modifications, additions, or omissions may be made to message flow 300. Message flow 300 may include more, fewer, or other messages, and the messages may include any information relevant to real-time data processing, real-time overdraft notification, crediting funds related to a check, and/or debiting funds related to a check. Additionally, messages may be communicated in any suitable order, in parallel, and/or sequentially. Any suitable component of may communicate any message of message flow 300.

Figure 4:
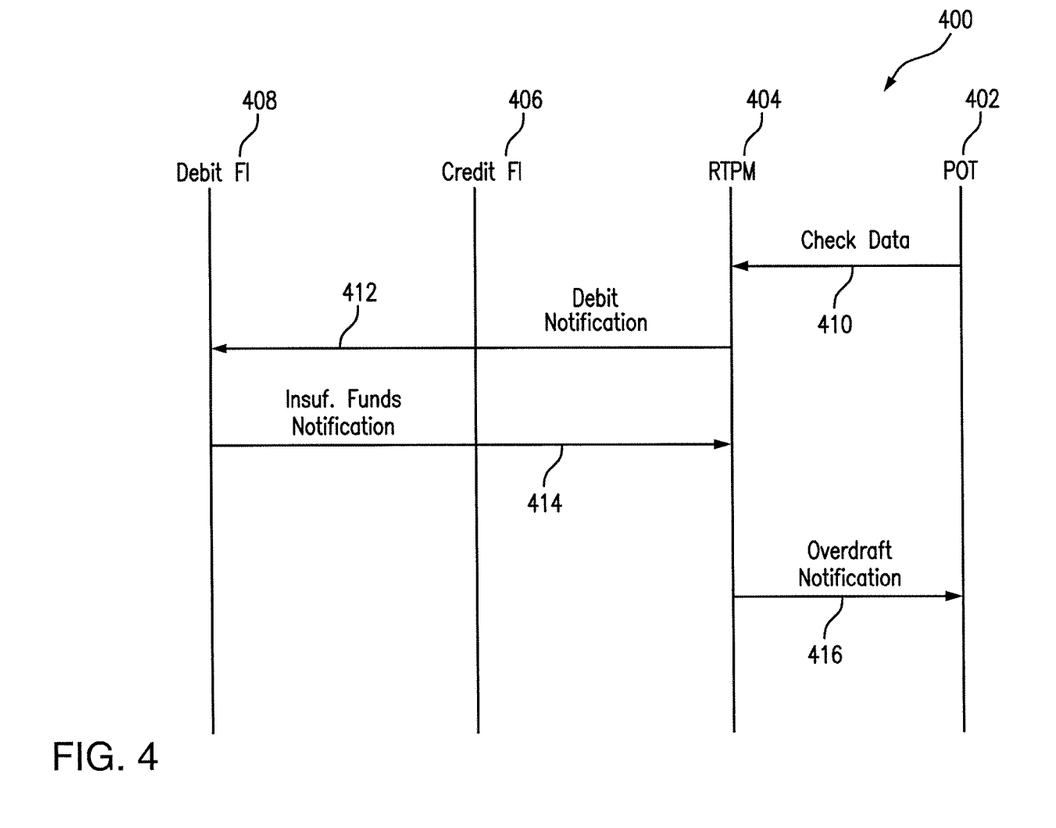
FIG. 4 illustrates an example message flow of an example system for real-time data processing.

FIG. 4 illustrates an example message flow 400 of an example system for real-time data processing. Message flow 400 includes POT ("point-of-transaction") 302, RTPM ("real-time processing module") 304, credit financial institution 306, and debit financial institution 308. These entities are explained in more detail with respect to FIG. 1.

Message flow 400 begins when POT 402 communicates a message including check data to RTPM 404. Check data may include any suitable information related to a check, for example, a scanned image of the check, account identifiers (e.g., account numbers), a debit amount (e.g., the amount for which the check is made out), a crediting entity (e.g., the entity to which the check is made out), a debit financial institution (e.g., the financial institution holding the checking account associated with the check), a credit financial institution (e.g., the financial institution holding the account where the debit amount from the check will be credited), or any other suitable information.

RTPM 404 may determine whether financial transaction involving the check data is qualified for real-time check processing (e.g., using database 128). If the financial transaction qualifies for real-time check processing, RTPM 404 communicates debit notification 412 to debit financial institution 408 indicating, for example, the debit amount, the debit account, and the credit account. Debit financial institution 408 may determine whether the identified debit account has sufficient funds to cover the debit amount. If debit financial institution 408 determines that the debit account has insufficient funds to cover the debit amount, debit financial institution communicates insufficient funds notification 414 to RTPM 404 indicating that the debit account has insufficient funds to cover the debit amount. In response to receiving insufficient funds notification 414, RTPM 404 communicates overdraft notification 416 to POT 402 indicating that the check has over drafted the debit account.

Modifications, additions, or omissions may be made to message flow 400. Message flow 400 may include more, fewer, or other messages, and the messages may include any information relevant to real-time data processing, real-time overdraft notification, crediting funds related to a check, and/or debiting funds related to a check. Additionally, messages may be communicated in any suitable order, in parallel, and/or sequentially. Any suitable component of may communicate any message of message flow 400.

Figure 5:
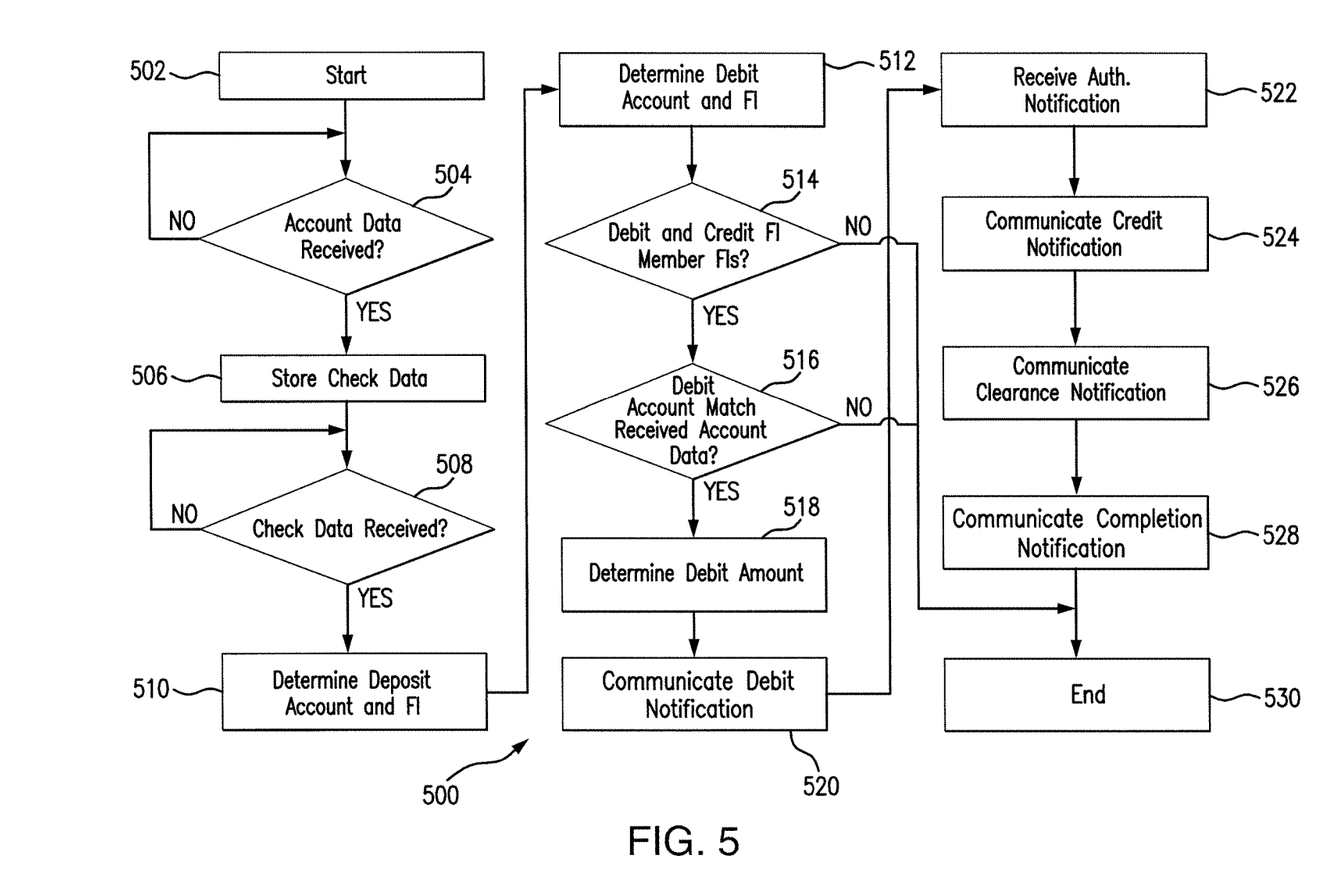
FIG. 5 illustrates a flow diagram of an example method for real-time data processing, according to certain embodiments of the present disclosure.

FIG. 5 illustrates a flow diagram of an example method 500 for real-time data processing, according to certain embodiments of the present disclosure. Method 500 begins at step 502. At step 504, it is determined whether account data has been received (e.g., by real-time processing module 120). If account data has not been received, method 500 returns to step 504. If account data has been received, method 600 proceeds to step 506 and the received account data is stored (e.g., in database 128). At step 508, it is determined whether check data has been received (e.g., by real-time processing module 130 from check readers 112). If check data has not been received, method 500 returns to step 508. If check data has been received, method 500 proceeds to step 510. At step 510, the deposit account and deposit financial institution are determined from the received check data (e.g., by real-time processing module 120).

At step 512, the debit account and debit financial institution are determined from the received check data (e.g., by real-time processing module 120). At step 514, it is determined (e.g., by real-time processing module 120) whether the debit financial institution and credit financial institution are member financial institutions. If either the debit financial institution or the credit financial institution are not member financial institution, the method ends at step 530. If the debit financial institution and the credit financial institution are both member financial institutions, the method proceeds to step 516. At step 516, it is determined (e.g., by real-time data processing module 120) whether the debit account is associated with the received account data. If the debit account is not associated with the received account data, the method ends at step 526. If the debit account is associated with the received account data, the method proceeds to step 518 and a debit amount is determined (e.g., by real-time processing module 120) from the received check data.

At step 520, a debit notification is communicated (e.g., by real-time data processing module 120) to the debit financial institution. At step 522, an authorization notification is received (e.g., by real-time data processing module 120) from the debit financial institution indicating a commitment (e.g., a contractual commitment based on the terms of membership to membership FIs 130) from the debit financial institution to transfer the debit amount to the credit financial institution. At step 524, a credit notification is communicated (e.g., by real-time processing module 120) to credit financial institution indicating the commitment from the debit financial institution to the credit financial institution to transfer the debit amount to the credit financial institution. At step 526, a clearance notification is received (e.g., by real-time processing module 120) indicating that the credit financial institution has made the debit amount available to the credit account holder for withdrawal. At step 528, a completion notification is communicated (e.g., by real-time processing module 120) to the POT 110 that communicated the check data indicating that the credit financial institution has made the debit amount available to the credit account holder for withdrawal. At step 530, method 500 ends.

Modifications, additions, or omissions may be made to method 500. The method may include more, fewer, or other steps. Additionally, steps may be performed in any suitable order, in parallel, and/or sequentially. Any suitable component of may perform one or more steps of method 500.

Figure 6:
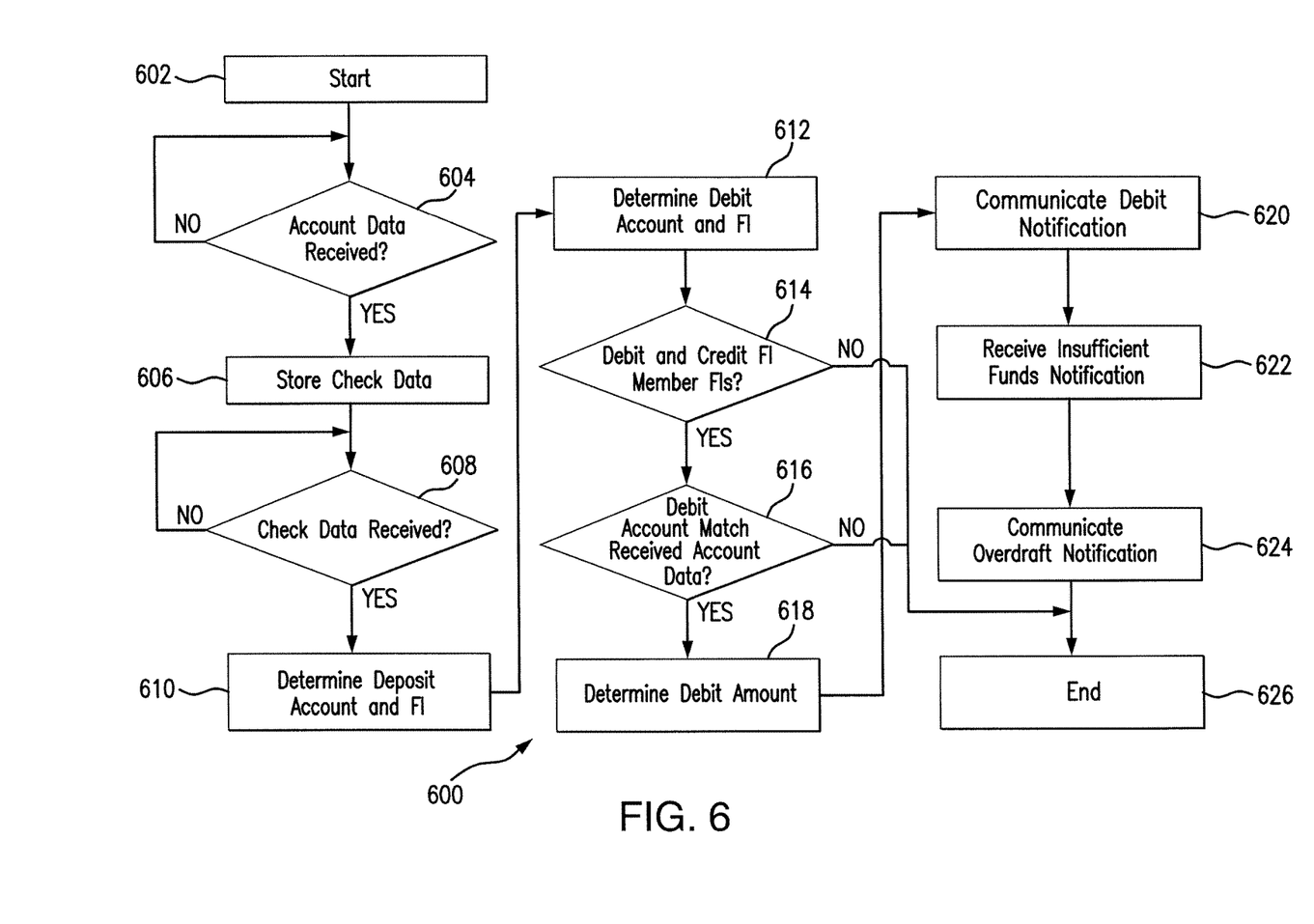
FIG. 6 illustrates a flow diagram of an example method for real-time data processing, according to certain embodiments of the present disclosure.

FIG. 6 illustrates a flow diagram of an example method 600 for real-time data processing, according to certain embodiments of the present disclosure. Method 600 begins at step 602. At step 604, it is determined whether account data has been received (e.g., by real-time processing module 120). If account data has not been received, method 600 returns to step 604. If account data has been received, method 600 proceeds to step 606 and the received account data is stored (e.g., in database 128). At step 608, it is determined whether check data has been received (e.g., by real-time processing module 130 from check readers 112). If check data has not been received, method 600 returns to step 608. If check data has been received, method 600 proceeds to step 610. At step 610, the deposit account and deposit financial institution are determined from the received check data (e.g., by real-time processing module 120).

At step 612, the debit account and debit financial institution are determined from the received check data (e.g., by real-time processing module 120). At step 614, it is determined (e.g., by real-time processing module 120) whether the debit financial institution and credit financial institution are member financial institutions. If either the debit financial institution or the credit financial institution are not member financial institution, the method ends at step 626. If the debit financial institution and the credit financial institution are both member financial institutions, the method proceeds to step 616. At step 616, it is determined (e.g., by real-time data processing module 120) whether the debit account is associated with the received account data. If the debit account is not associated with the received account data, the method ends at step 626. If the debit account is associated with the received account data, the method proceeds to step 618 and a debit amount is determined (e.g., by real-time processing module 120) from the received check data.

At step 620, a debit notification is communicated (e.g., by real-time data processing module 120) to the debit financial institution. At step 622, an insufficient funds notification is received (e.g., by real-time data processing module 120) from the debit financial institution indicating that the debit account has insufficient funds to cover the debit amount. At step 624, an overdraft notification is communicated (e.g., by real-time processing module 120) to the POT 110 that communicated the check data indicating that the check associated with the communicated check data (e.g., a scanned check) is bad and should not be accepted. At step 626, method 600 ends.

Modifications, additions, or omissions may be made to method 600. The method may include more, fewer, or other steps. Additionally, steps may be performed in any suitable order, in parallel, and/or sequentially. Any suitable component of may perform one or more steps of method 600.

Certain embodiments of the present disclosure may provide one or more technical advantages having specific technical effects.

In an embodiment, the system provides real-time access to funds from a deposited check, thereby conserving bandwidth and computational resources consumed by placing temporary holds on deposited funds until the deposited formally clears (e.g., automated clearing house ("ACH").

In an embodiment, the system provides real-time overdraft detection, thereby conserving the bandwidth and computational resources consumed by reversing a completed transaction due to an overdrawn account.

Other technical advantages of the present disclosure will be readily apparent to one skilled in the art from the following figures, descriptions, and claims. Moreover, while specific advantages have been enumerated above, various embodiments may include all, some, or none of the enumerated advantages.

What is claimed is:

1. A system for real-time overdraft detection, comprising:
one or more interfaces operable to:
receive account data for financial accounts at plurality of financial institutions, the received account data including one or more from the set comprising an account identifier and an approved debit amount associated with the account identifier; and
receive check data from a scanned check, the check data indicating that an amount is to be transferred from a debit account to a deposit account;
one or more databases communicatively coupled to the one or more interfaces, the one or more databases operable to store the received account data;
one or more processors communicatively coupled to the one or more interfaces and one or more databases, the one or more processors operable to:
determine a deposit financial institution for the determined deposit account;
determine a debit financial institution for the determined debit account;
determine that the deposit financial institution and the debit financial institution have entered into an agreement with each other for the debit financial institution to verify the check and make the amount available to the deposit account within a minute of deposit of the check;
receive an insufficient funds notification from the debit financial institution indicating that the debit account has insufficient funds to cover the amount; and
in response to the insufficient funds notification, prevent the check from being deposited.

2. The system of claim 1, the one or more processors further operable to determine that the debit amount exceeds the approved debit amount; and
the one or more interfaces further operable to communicate a declined transaction notification to a deposit account holder in response to determining that the debit amount exceeds the approved debit amount, the declined transaction notification notifying the deposit account holder that the debit amount cannot be credited to the deposit account holder.

3. The system of claim 2, wherein the declined transaction notification further identifies the approved debit amount.

4. The system of claim 2, the one or more interfaces further operable to communicate the declined transaction notification to one or more of the debit account holder and the debit financial institution.

5. The system of claim 1, the one or more interfaces further operable to:
communicate a debit notification to the debit financial institution, the debit notification at least a portion of the received check data;
receive an insufficient funds notification from the debit financial institution in response to communicating the debit notification, the insufficient funds notification representing a determination by the debit financial institution that the debit amount exceeds the amount of money in the debit account;
communicate an overdraft notification to the deposit account holder in response to receiving the insufficient funds notification, the overdraft notification notifying the deposit account holder that the check is overdrawing the debit account.

6. The system of claim 5, the one or more interfaces further operable to communicate the overdraft notification to the debit account holder.

7. The system of claim 5, the one or more processors further operable to remove the debit account from the database in response to receiving the insufficient funds notification.

8. A non-transitory computer readable medium comprising logic for real-time overdraft detection, the logic when executed by a processor operable to:
receive account data for financial accounts at plurality of financial institutions, the received account data including one or more from the set comprising an account identifier and an approved debit amount associated with the account identifier;
receive check from a scanned check, the check data indicating that an amount is to be transferred from a debit account to a deposit account;
store the received account data;
determine a deposit financial institution for the determined deposit account;
determine a debit financial institution for the determined debit account;
determine that the deposit financial institution and the debit financial institution have entered into an agreement with each other for the debit financial institution to verify the check and make the amount available to the deposit account within a minute of deposit of the check;
receive an insufficient funds notification from the debit financial institution indicating that the debit account has insufficient funds to cover the amount; and
in response to the insufficient funds notification, prevent the check from being deposited.

9. The non-transitory computer readable medium of claim 8, the logic further operable to:
determine that the debit amount exceeds the approved debit amount; and
communicate a declined transaction notification to a deposit account holder in response to determining that the debit amount exceeds the approved debit amount, the declined transaction notification notifying the deposit account holder that the debit amount cannot be credited to the deposit account holder.

10. The non-transitory computer readable medium of claim 9, wherein the declined transaction notification further identifies the approved debit amount.

11. The non-transitory computer readable medium of claim 9, the logic further operable to communicate the declined transaction notification to one or more of the debit account holder and the debit financial institution.

12. The non-transitory computer readable medium of claim 8, the logic further operable to:
communicate a debit notification to the debit financial institution, the debit notification at least a portion of the received check data;
receive an insufficient funds notification from the debit financial institution in response to communicating the debit notification, the insufficient funds notification representing a determination by the debit financial institution that the debit amount exceeds the amount of money in the debit account; and
communicate an overdraft notification to the deposit account holder in response to receiving the insufficient funds notification, the overdraft notification notifying the deposit account holder that the check is overdrawing the debit account.

13. The non-transitory computer readable medium of claim 12, the logic further operable to communicate the overdraft notification to the debit account holder.

14. The non-transitory computer readable medium of claim 12, the logic further operable to remove the debit account from the database in response to receiving the insufficient funds notification.

15. A method for real-time overdraft detection, comprising:
receiving account data for financial accounts at plurality of financial institutions, the received account data including one or more from the set comprising an account identifier and an approved debit amount associated with the account identifier;
receiving check data from a scanned check, the check data indicating that an amount is to be transferred from a debit account to a deposit account;
storing the received account data;
determining a deposit financial institution for the determined deposit account;
determining a debit financial institution for the determined debit account;
determining that the deposit financial institution and the debit financial institution have entered into an agreement with each other for the debit financial institution to verify the check and make the amount available to the deposit account within a minute of deposit of the check;
receiving an insufficient funds notification from the debit financial institution indicating that the debit account has insufficient funds to cover the amount; and
in response to the insufficient funds notification, preventing the check from being deposited.

16. The method of claim 15, further comprising:
determining that the debit amount exceeds the approved debit amount; and
communicating a declined transaction notification to a deposit account holder in response to determining that the debit amount exceeds the approved debit amount, the declined transaction notification notifying the deposit account holder that the debit amount cannot be credited to the deposit account holder.

17. The method of claim 16, wherein the declined transaction notification further identifies the approved debit amount.

18. The method of claim 16, further comprising communicating the declined transaction notification to one or more of the debit account holder and the debit financial institution.

19. The method of claim 15, further comprising:
- communicating a debit notification to the debit financial institution, the debit notification at least a portion of the received check data;
- receiving an insufficient funds notification from the debit financial institution in response to communicating the debit notification, the insufficient funds notification representing a determination by the debit financial institution that the debit amount exceeds the amount of money in the debit account; and
- communicating an overdraft notification to the deposit account holder in response to receiving the insufficient funds notification, the overdraft notification notifying the deposit account holder that the check is overdrawing the debit account.

20. The method of claim 19, further comprising communicating the overdraft notification to the debit account holder.

* * * * *